Jan. 5, 1943. A. J. KEYZER 2,307,276
STEREOSCOPIC PROJECTION AND OBSERVATION APPARATUS
Filed July 15, 1940 3 Sheets-Sheet 2
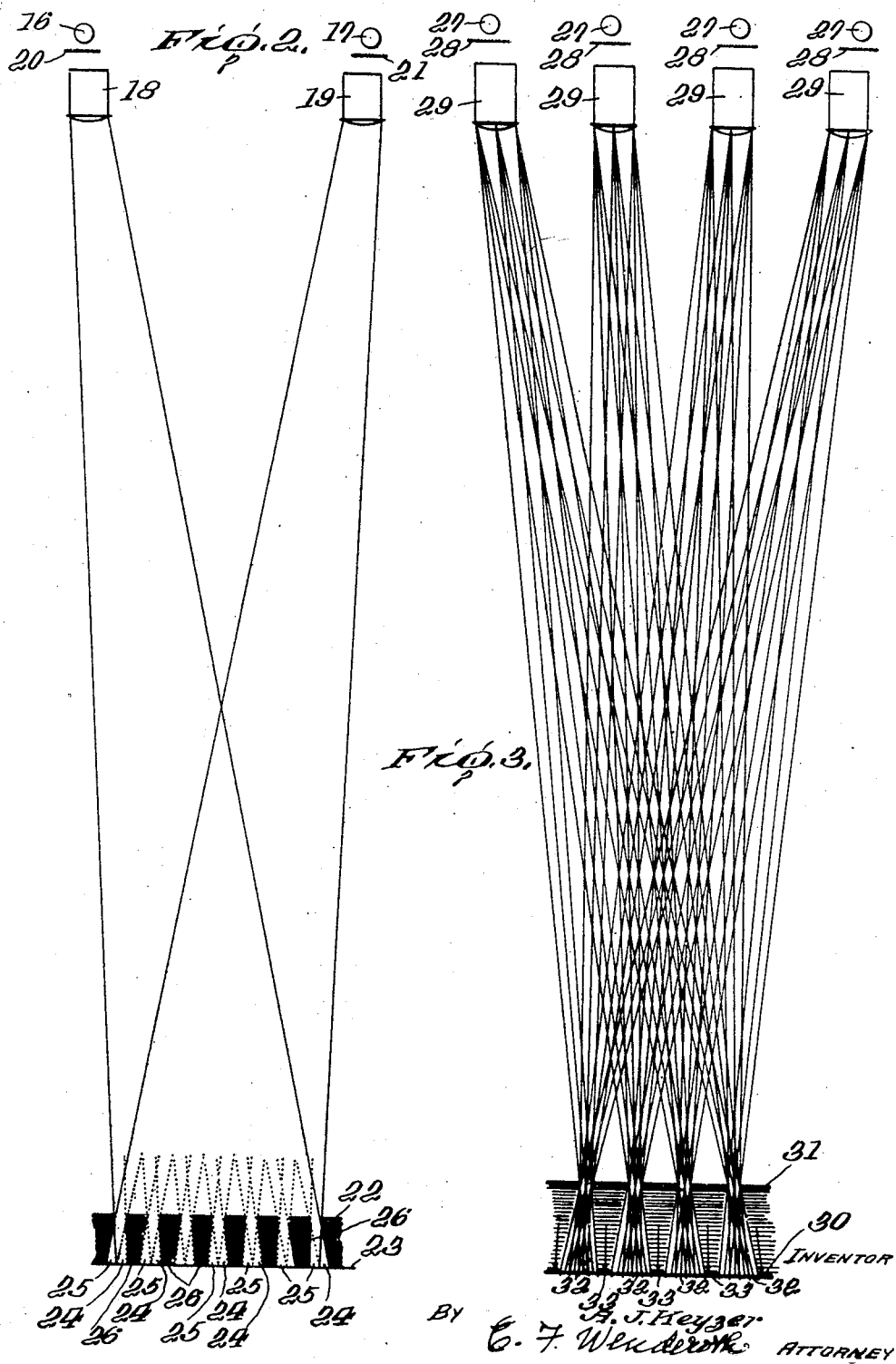

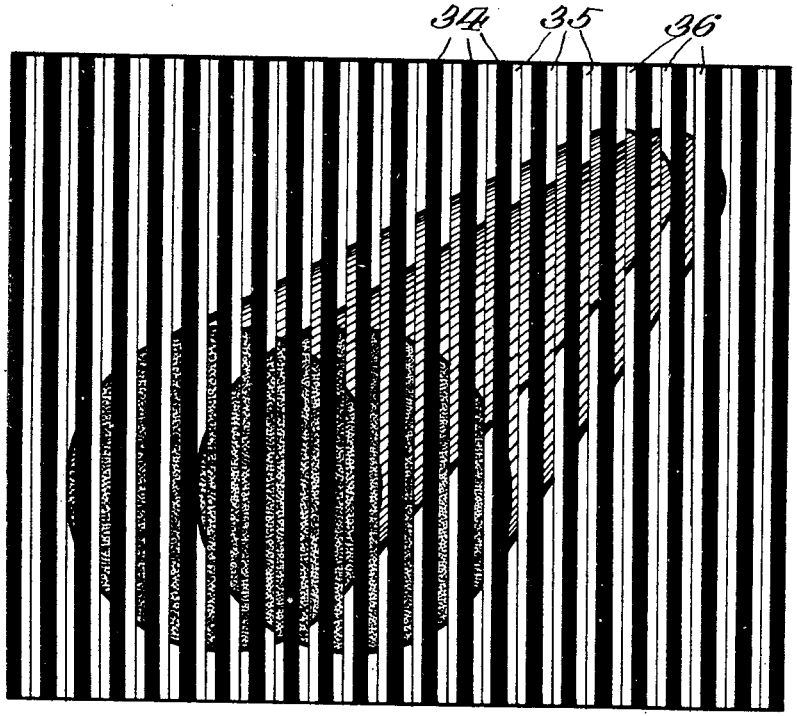

Patented Jan. 5, 1943

2,307,276

UNITED STATES PATENT OFFICE 2,307,276

STEREOSCOPIC PROJECTION AND OBSERVATION APPARATUS

Albertus J. Keyzer, New York, N. Y.

Application July 15, 1940, Serial No. 345,632

8 Claims. (Cl. 88—16.6)

This invention relates to an apparatus for the projection and observation of stereoscopic images and is for example adaptable for stills, television and cinematographic pictures.

When vertical alternating strips of a picture taken from the position of the right eye and taken from the position of the left eye are juxtaposed upon a plane or screen and such composite picture is viewed through a grating consisting of vertical lines in such a way that the right eye of the observer can only see the strips constituting the right-hand picture and the left eye only the strips of the left-hand picture, then a stereoscopic effect is obtained. The disadvantage of such an apparatus exists in the fact that if the observer should move his head slightly in either direction in a horizontal plane the stereoscopic effect will immediately be entirely or partially lost and a so-called pseudo-stereoscopic effect will arise as soon as the right eye of the observer sees strips on the screen designed for the left eye and the left eye sees strips which were designed to be observed by the right eye. If the viewpoint is moved further in the same direction in the horizontal plane then for a short time the stereoscopic effect is again observed and is then immediately lost. Therefore, the observation field comprises sections where alternately stereoscopic and pseudo-stereoscopic and even double pictures are visible. The sections in which a stereoscopic effect may be obtained are considerably narrower in the horizontal plane than the sections where the stereoscopic effect is not obtained. Furthermore, the observation range, that is, the space in which the observer must be located in order to observe the stereoscopic effect is limited in depth as well as in width. These disadvantages bring about the limited practical application of the apparatus. It is an object of the invention to provide an apparatus and arrangement which will overcome the above disadvantages.

It is also an object of the invention to provide means and methods whereby the pseudo-stereoscopic and double pictures are eliminated.

With the above and other objects in view which will become apparent from the detailed description below, the invention is shown in the drawings in which:

Fig. 2 illustrates diagrammatically the projection of stereoscopically corresponding pictures, according to the invention, through grating slits with the interpositioning of blank strips formed by the shadows created by the grating.

Figure 1:
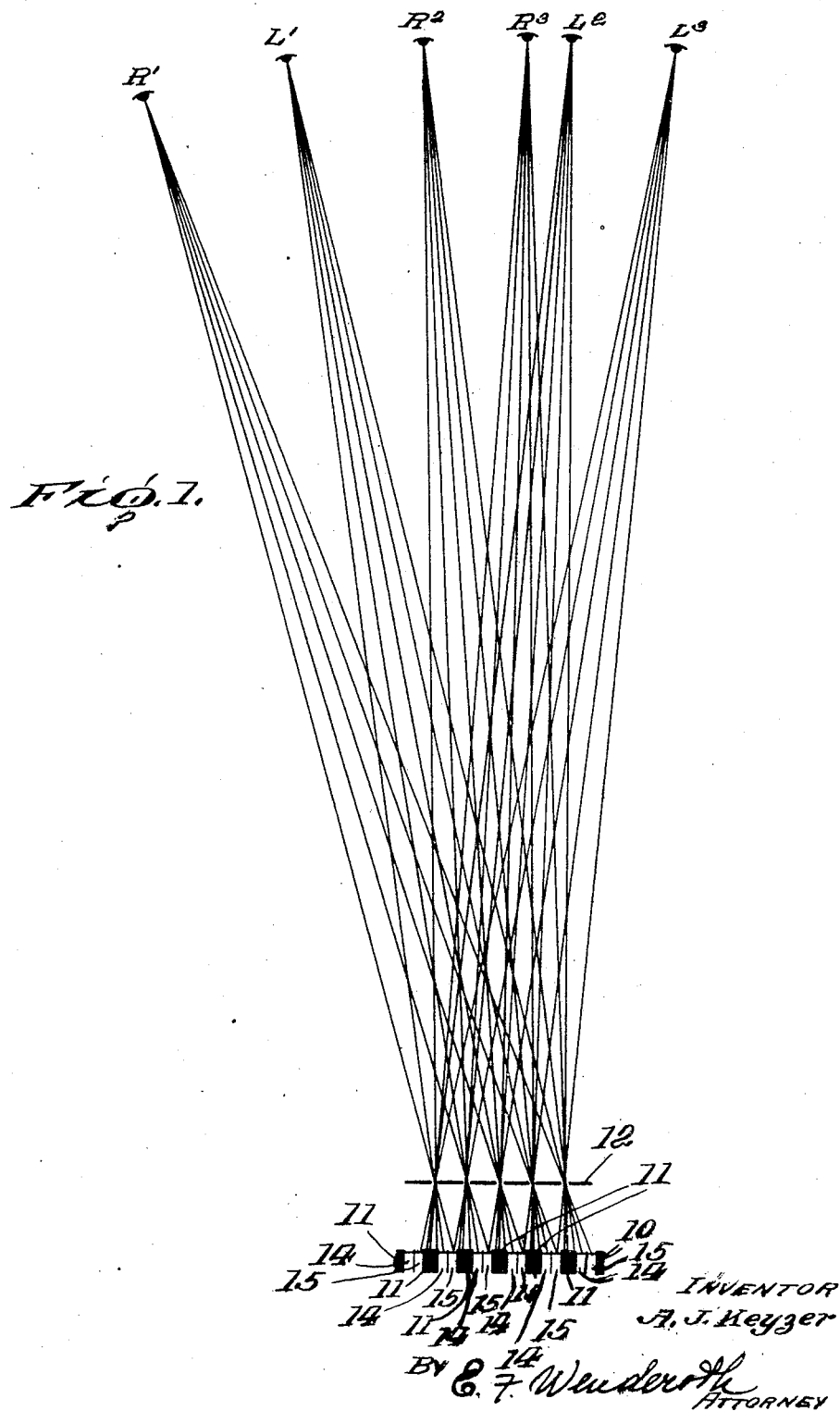
Fig. 1 is a diagrammatic representation illustrating how, with the present invention, a displacement of the points of observation causes a stereoscopic effect picture, a flat non-stereoscopic effect picture and a darkened screen, as viewed in turn by the eyes of an observer.

Fig. 3 illustrates diagrammatically the projection of a plurality of strips of stereoscopically corresponding pictures, according to another form of the invention, through grating strips with the formation of shadow lines intercalated between the picture strips constituting each group, and Fig. 4 shows a plan view of a screen or plane on which stereoscopically corresponding picture portions are located in groups of picture strips separated one from the other by black lines.

In order to overcome the disadvantages outlined above the picture strips which are located on the plane or screen in back of the observation grating are separated into groups by means of blank strips so that each group on the screen comprises one strip of a right-hand picture and one strip of a left-hand picture. The blank strip separating these groups may vary in density according to the effect desired.

By the above separation of the picture strips into groups by means of blank strips, the observer when moving his viewpoint in a horizontal direction, for example, from the left to the right, will successively observe the following pictures:

1. A stereoscopic effect picture which is seen when the left eye of the observer sees only the strips constituting the left-hand picture and the right eye sees only the strips forming the right-hand picture.

2. A flat picture which is seen when the left eye of the observer sees only the strips comprising the right-hand picture and the right eye sees only the blank separating strips.

3. No picture at all, which takes place when both eyes see only the blank strips which form in conjunction with the bars of the grating a dense plane.

4. A flat picture which occurs when the right eye of the observer sees only the strips of the left-hand picture and the left eye sees the blank strips.

5. A stereoscopic effect picture again wherein both eyes of the observer are again perceiving the picture strips designed for them.

From the above analysis it will be noted that the double picture and the confusing pseudo-stereoscopic picture are substituted by a flat picture and a dense pictureless plane respectively so that the observer may quickly adjust his viewpoint in order to secure the correct stereoscopic effect. This makes the invention suitable for stills and television and especially adapted for sub-standard motion pictures.

In order to secure the composite picture desired on the screen two cinematographically taken stereoscopic right and left-hand pictures are projected from two horizontally spaced basic points. These pictures are projected through a grating for front projection on a diffusely reflecting projection screen and for back projection they are projected through a grating onto a semi-transparent screen, and following the semi-transparent screen there is placed a grating which serves as a selecting medium.

If the distances from the projector to the grating, from the grating to the screen, and the distance between the two basic points of projection are given, then the ratio between the width of the slits of the grating and the breadth of the bars must be such that the groups, (each group consisting of left-hand and right-hand picture strips destined respectively for the left and right eye) are separated by shadow lines, (which shadow lines, as a matter of fact, virtually are the nuclear shadows of the grating bars). Accordingly, the distances between the grating slits must be so great as to secure that the grating bars can project a nuclear shadow of sufficient breadth. If those distances are extremly great, the picture seen by the observer may be distorted by visible blank lines, whereby this would mean a considerable loss of light and, besides this, the sections where the picture is observed stereoscopically, would be separated too far one from the other. If, on the other hand, the distances between the slits are too small, the blank shadow lines would then become too narrow and this would cause the effect that the observer by horizontal displacement of his head would still see for a short moment, double or pseudo-stereoscopic pictures. Practice shows that the best results are achieved when the blank shadow line is broader than one left or right-hand picture strip.

In case of front projection, a grating with the above described ratio is at the same time the observation grating for selecting purposes. In the case of back projection, the observation grating which is located at the opposite side of the screen, must possess such a width (spacing between slits) that both eyes of an observer, when located in certain places within the observation field, can perceive simultaneously the black separating line through one slit of the grating and at the same time through all slits separating lines only. With such conditions the disturbing effects are eliminated. If the number of the slits per inch of the observation screen is slightly increased, then the distance between the grating and the observation field becomes greater, while the depth of this field is increased as well. If, on the other hand, the number of slits per inch is decreased, then the observation field comes nearer to the grating.

The principle of the invention is also applicable to pictures whereby the picture strips represent photographic or cinematographic pictures, taken from more than two points, located on a horizontal line, and whereby the ultimate picture is perceived stereoscopically when the left and the right eye see stereoscopically corresponding left-hand and right-hand portion pictures. If, in this case the left eye sees the strips of the picture, taken from the extreme right and the right eye the strips of the picture taken from the extreme left, then the pseudo-stereoscopic effect becomes very disturbing. In order to overcome this drawback, here as well, conforming with the invention, the picture strips must be split into groups, whereby each group consists of as many portion picture strips as there were horizontally spaced picture-taking basic points, while these groups are separated one from the other by means of pictureless lines which preferentially should be wider than one picture strip. In order to achieve this purpose with regard to cinematographic projection from more than two basic points, here as well the distances between the slits of the grating must be great enough to insure that the bars of the grating project nuclear shadow lines between the groups of picture strips. In the case of back projection of more than two stereoscopically corresponding pictures simultaneously, the observation grating must possess slits of such a width that both eyes of the observer when located at certain points in the observation field, can simultaneously perceive the black separating lines between the groups of picture strips, by means of which the phenomena of double and pseudo-stereoscopic pictures are eliminated.

Referring to the drawings similar reference characters are used throughout the various views to indicate like parts.

In Fig. 1 the arrangement is shown diagrammatically for viewing a composite picture upon the screen 10. Upon such screen there is a picture comprising the strips 14 which are strips of the picture as seen by the left eye and juxtaposed strips 15 which are strips of the same picture as seen by the right eye and intercalated between the groups of strips are the blank strips 11. The grating which in this case serves as a selecting or observation grating is shown diagrammatically at 12.

When the eyes of an observer are positioned at $R^1$ and $L^1$ wherein R indicates the right eye and L the left eye of the observer, then the observer's right eye will see only the right-hand picture strips 15 on the screen 10 and the observer's left eye will see only the left-hand picture strips 14 on the screen 10 and therefore a perfect stereoscopic effect picture will be viewed.

However, when the observer has changed his position in the horizontal plane so that his right eye is positioned at $R^2$ and his left eye at $L^2$, then he will view with both eyes through the openings of the grating the blank strips 11 which in this case are black strips and this will form, together with the bars of the grating 12 a black plane.

If the observer now further shifts his horizontal position so that his right eye is positioned at $R^3$ and his left eye at $L^3$ then in this case he will see a flat picture because his left eye will see through the grating the right-hand picture strips 15 while his right eye will observe through the grating the blank lines 11. This figure therefore illustrates the three possible views which the observer may see in changing his position along a horizontal plane and it will be noted that pseudo-stereoscopically pictures and double pictures are entirely eliminated.

In Fig. 2 there is shown diagrammatically the manner in which right and left-hand pictures may be simultaneously projected through a grating and at the same time this grating may serve as the selecting medium for observers positioned in front of the screen. If for example the projectors are positioned about ten feet from the screen, the observers may observe the projected pictures within a range from about seven feet to thirteen feet from the screen. The light source for the right-hand picture is shown at 16 and the left-hand light source is shown at 17. The objective for the light source 16 is shown at 18 and that for the light source 17 is shown at 19. The right-hand picture to be projected is shown at 20 and may constitute a film or a transparent still. The left-hand picture to be projected is indicated at 21.

The grating is shown at 22 and the screen at 23. It will be noted that the grating is spaced from the screen the proper distance as indicated above, so as to form on the screen the right-hand strip portions 24 and the left-hand strip portions 25 with the nuclear shadow lines 26 formed by the grating bars disposed between the groups of left and right-hand strips.

In Fig. 3 there is illustrated an arrangement in which there are provided a plurality of projection objectives which are horizontally juxtaposed. In this arrangement the sources of light for the four projectors shown are indicated at 27 and the four stereoscopically corresponding portion pictures are shown at 28. The pictures are projected through the objectives 29 and will form on the screen 30 due to the grating 31, groups 32 of picture strips which correspond to the groups 24 and 25 of the arrangement shown in Fig. 2.

The shadow lines formed by the grating bars upon the screen are shown at 33. We have, therefore, the same arrangement as in Fig. 2 with the sole exception that instead of two projection points corresponding to the right and the left eye there are four projection points which correspond to additional positions from which the picture is taken and projected.

The grating 22 in Fig. 2 and the grating 31 in Fig. 3 both serve as selecting mediums in viewing the pictures projected upon the screens.

In Fig. 4 there is illustrated the composite picture which is projected upon a screen by the projectors such as shown in Fig. 2. This constitutes the composite picture which when viewed through the grating positioned at the correct position, will give the stereoscopic, flat and pictureless views mentioned above. In this figure the strips 34 are the blank strips which are indicated in this case as black and which are disposed between the groups of right-hand portion picture strips 35 and the left-hand portion picture strips 36. The image is indicated as it appears upon the composite picture but, of course, this will be properly integrated when stereoscopically viewed or when viewed as a flat picture as seen by one eye only.

In the appended claims, except where otherwise specified, the term "group" is intended to refer to two or more picture strips, each representing portions of a view as seen from different basic points.

The arrangements described above are the present preferred arrangements and are not to be construed in a limiting sense. All modifications as will fall within the scope of the following claims are claimed.

I claim:

1. An apparatus for making two stereoscopically corresponding photographic or cinematographic portion pictures stereoscopically observable, comprising two projectors, a grating and a projection screen placed behind said grating, with the distances between the objective-axes of the projectors, between projectors and grating, between grating and projection screen and between the slits of the grating, so related and selected that the two stereoscopically corresponding portion pictures are split into distinct groups of picture strips on the screen, each group comprising one strip of the right-hand picture juxtaposed with one strip of the left-hand picture and said groups being separated one from the other by nuclear shadow lines wider than each said picture strip.

2. An apparatus for making two stereoscopically corresponding photographic or cinematographic portion pictures streoscopically observable, comprising a pair of projectors, a grating and a projection screen placed behind said grating, with the distances between the objective-axes of the projectors, between projectors and grating, between grating and projection screen and between the slits of the grating, so related and selected that the two stereoscopically corresponding portion pictures are split into distinct groups of picture strips on the screen, each group comprising one strip of the right-hand picture juxtaposed with one strip of the left-hand picture, said groups being separated one from the other by nuclear shadow lines which are at least as wide as each said picture strip, and said grating located between said projection screen and projectors serving as a selection screen for the stereoscopic perception of the pictures.

3. An apparatus for making two stereoscopically corresponding photographic or cinematographic portion pictures stereoscopically observable comprising a multiprojector casting more than two portion pictures from more than two basic points, a grating and a semi-transparent projection screen placed behind said grating, with the distances between the more than two basic points of projection, between projectors and grating, between grating and projection screen and between the slits of the grating, so related and chosen that the more than two stereoscopically corresponding portion pictures are split in groups of picture strips on the screen, each group consisting of as many picture strips as there were basic points of picture-taking and arranged in the same, or reversed order, as the taking points were arranged, the groups being separated one from the other by the nuclear shadow lines of the grating bars, and an observation grating on the opposite side of said screen having a ratio of breadth of slits and bars so that not more than one picture strip or one shadow line is perceivable at one time through one grating slit by one eye when in the normal field of observation for the screen.

4. A method for observing pictures stereoscopically, with avoidance of pseudo-stereoscopic effects which comprises forming on a screen, a series of spaced strips of a picture representing a scene as viewed from one basic point, alternating with another series of strips of a picture representing said scene as viewed from another basic point, each of the latter strips having an edge conterminous with an edge of one of said firstnamed strips, said strips being so grouped that one strip corresponding to each basic point occurs in each group and a pictureless strip of a width somewhat greater than each of said picture strips occurs between groups, locating a grating in front of said screen at such distance therefrom and from the observer, with grating bars and slits parallel to said strips and of such widths as compared with said strips, that the following series of image effects are presented to the observer upon shifting his position sideways, viz: stereoscopic—flat picture seen with one eye—blank—flat picture seen with other eye—stereoscopic.

5. A composite picture for stereoscopic effects, comprising a series of spaced strips of a picture representing a scene as viewed from one basic point, alternating with another series of strips of a picture representing said scene as viewed from another basic point, each of the latter strips having an edge conterminous with an edge of one of said first-named strips, said strips being so grouped that one strip corresponding to each basic point occurs in each group and a pictureless strip of a width somewhat greater than each of said picture strips occurs between groups.

6. A composite picture for stereoscopic effects, comprising a screen having thereon a series of spaced strips of a picture representing a scene as viewed from one basic point, alternating with another series of strips of a picture representing said scene as viewed from another basic point, an edge of each of the latter strips being substantially conterminous with an edge of one of said first-named strips, said strips being distinctly grouped so that one strip corresponding to each basic point occurs in each group and a pictureless strip occurs between groups of a width at least as great as the width of each of said picture strips, and a grating in front of said scheen at such distance therefrom and from the normal field for observation for the picture, and with grating bars and slits parallel to said strips and of such widths as compared with said strips, that the following series of image effects are presented to the observer upon shifting his position sideways, viz: stereoscopic—flat picture seen with one eye—blank—flat picture seen with other eye—stereoscopic.

7. In the method for forming pictures for stereoscopic observation through a stereoscopic observation grating, the steps comprising: projecting onto a screen, a series of spaced-apart strips of a picture representing a view as seen from one basic point, projecting another series of picture strips onto the screen in positions alternating with said first mentioned strips and representing said view as seen from another basic point, each of the latter strips being projected in positions on the screen to have an edge substantially conterminous with an edge of one of said first mentioned strips, and to form a group with the latter whereby each group comprises strips respectively corresponding to each of the basic points, and each group is separated from the next group by a pictureless strip which is at least substantially as wide as each picture strip.

8. Method for forming and observing stereoscopic pictures comprising: projecting onto a screen a series of spaced-apart strips of a picture representing a view as seen by the right eye or from one basic point, projecting another series of picture strips onto the screen in positions alternating with said first mentioned strips and representing said view as seen with the left eye or from another basic point, each of the latter strips being projected in positions on the screen to have an edge substantially conterminous with an edge of one of said first mentioned strips, and to form a group with the latter whereby each group comprises strips respectively corresponding to each of the basic points, and each group is separated from the next group by a pictureless trip which is at least substantially as wide as each picture strip, and observing the groups of picture strips thus formed, through a stereoscopic observation grating with bars covering the right eye picture strips from observation by the observer's right eye when in positions to observe the left eye picture strips, and also covering the left eye picture strips from observation by the observer's left eye when in positions to observe the right eye picture strips.

ALBERTUS J. KEYZER.